United States Patent
He et al.

(10) Patent No.: US 8,894,797 B2
(45) Date of Patent: Nov. 25, 2014

(54) METHOD OF SPLICING POLARIZED FILMS

(75) Inventors: Chengming He, Guangdong (CN);
Quan Cheng, Guangdong (CN); Liang Xu, Guangdong (CN); Rong Cao, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 152 days.

(21) Appl. No.: 13/636,637

(22) PCT Filed: May 30, 2012

(86) PCT No.: PCT/CN2012/076251
§ 371 (c)(1),
(2), (4) Date: Sep. 21, 2012

(87) PCT Pub. No.: WO2013/174028
PCT Pub. Date: Nov. 28, 2013

(65) Prior Publication Data
US 2013/0312902 A1 Nov. 28, 2013

(30) Foreign Application Priority Data
May 24, 2012 (CN) .......................... 2012 1 0163663

(51) Int. Cl.
*B32B 38/04* (2006.01)

(52) U.S. Cl.
USPC ............ 156/258; 156/248; 156/289; 156/299

(58) Field of Classification Search
CPC ............ B29C 66/004; B29C 66/02241; B29C 66/034; B29C 66/342; B29C 66/472; B32B 37/003; B32B 38/0004; B32B 38/105; G02F 1/0045
USPC ......... 156/248, 256, 152, 159, 289, 297, 299, 156/304.5, 267, 258
See application file for complete search history.

(56) References Cited

U.S. PATENT DOCUMENTS

| | | | | |
|---|---|---|---|---|
| 3,874,968 A | * | 4/1975 | Robinson | 156/154 |
| 4,009,065 A | * | 2/1977 | Mikulas | 156/159 |
| 4,169,752 A | * | 10/1979 | Tokuno | 156/157 |
| 4,240,855 A | * | 12/1980 | Pennington | 156/159 |
| 4,744,845 A | * | 5/1988 | Posey | 156/159 |

(Continued)

FOREIGN PATENT DOCUMENTS

| | | |
|---|---|---|
| CN | 101048681 A | 10/2007 |
| CN | 101568863 A | 10/2009 |
| KR | 2007007675 A | 7/2007 |

*Primary Examiner* — Linda L Gray
(74) *Attorney, Agent, or Firm* — Muncy, Geissler, Olds & Lowe, P.C.

(57) ABSTRACT

The present invention discloses a method of splicing polarized films. The method includes steps of providing a substrate; attaching a first polarized film to the substrate; attaching a second polarized film to the substrate so that a side portion of the second polarized film is correspondingly overlapped with a side portion of the first polarized film; correspondingly cutting off the overlapped side portions of the first polarized film and the second polarized film; removing separated parts of the side portions from the first polarized film and the second polarized film; and performing a flatten treatment to the cut side portions of the first polarized film and the second polarized film. The method effectively reduces the interval between spliced polarized films so that the light leakage problem at the joint position is improved.

11 Claims, 2 Drawing Sheets

(56) References Cited

U.S. PATENT DOCUMENTS

| | | | | |
|---|---|---|---|---|
| 4,944,514 | A | * | 7/1990 | Suiter .......................... 473/117 |
| 5,320,698 | A | * | 6/1994 | Fournier et al. ............... 156/159 |
| 5,903,328 | A | * | 5/1999 | Greene et al. .................. 349/73 |
| 8,002,924 | B2 | * | 8/2011 | Machamer .................... 156/159 |
| 8,062,450 | B2 | * | 11/2011 | Odawara et al. .............. 156/159 |
| 8,398,806 | B2 | * | 3/2013 | Yokouchi et al. ............. 156/257 |
| 8,432,515 | B2 | * | 4/2013 | Mizushima et al. .......... 349/117 |
| 2006/0225827 | A1 | * | 10/2006 | Lei et al. ......................... 156/64 |
| 2007/0296890 | A1 | * | 12/2007 | Mizushima et al. ............ 349/96 |
| 2008/0096318 | A1 | * | 4/2008 | Hariu ............................. 438/110 |
| 2008/0099128 | A1 | * | 5/2008 | Yamada et al. ................ 156/152 |
| 2009/0186170 | A1 | * | 7/2009 | Yamamoto et al. ........... 428/1.31 |

* cited by examiner

METHOD OF SPLICING POLARIZED FILMS

BACKGROUND OF THE INVENTION

1. Field of the Invention

The present invention relates to a manufacturing technology of liquid crystal display device, especially to a method of splicing polarized films.

2. Description of the Related Art

Liquid crystal display device (LCD) has been widely used in all kinds of electronic products. Presently a liquid crystal display device mainly includes two transparent substrates, a liquid crystal layer mounted between the substrates and two polarized films respectively mounted on outer surfaces of the substrates.

The polarized films are important components in a liquid crystal display device. When lights pass through one of the polarized films, the lights become polarized lights in the same polarization direction as the polarization axis of the polarized film. Liquid crystal molecules of the liquid crystal layer are controlled by an external electric filed and accordingly twist, thereby controlling whether the polarized lights can pass through the other polarized film so as to change the brightness of each pixel in the liquid crystal display device.

In general, polarized film suppliers provide polarized films in rolls for sale. Polarized-film rolls in the present market are limited in width (lower than 2 meters) due to the limitation of the manufacturing equipments, thus, if a manufacturer tends to produce liquid crystal display panels having widths larger than the width of the purchased polarized films (for example, larger than 2 meters), it is necessary for the manufacturer to splice the polarized films.

Thus, manufacturers of thin-film transistor LCD all use a polarized-film splicing technology to manufacture products with larger sized liquid crystal display devices. With reference to FIG. 1, a first polarized film 80 firstly is attached to a surface of a liquid crystal cell 9, and then a second polarized film 81 is aligned with an edge of the first polarized film 80 and attached to the surface of the liquid crystal cell 9. However, the splicing accuracy of the present splicing technology is limited (0.3 micro-meters approximately), and there is a certain interval 800 between the spliced polarized films 80, 81, and thereby causing the liquid crystal display device to have light leakage at the position of the interval 800 such that the pixels corresponding to the position of the interval 800 cannot display correctly.

Therefore, it is necessary to provide a method of splicing polarized films to overcome the problems existing in the conventional technology.

SUMMARY OF THE INVENTION

In view of the shortcomings of the conventional technology, the main objective of the invention is to provide a method of splicing polarized films which effectively reduce the interval between two spliced polarized films, and thereby improving the light leakage problem occurring at the joint position.

In order to achieve the foregoing objective of the present invention, the present invention provides a method of splicing polarized films which comprises steps of:

providing a substrate;

attaching a first polarized film to the substrate, wherein an anti-adhesive material is mounted on an upper surface and a lower surface of a side portion of the first polarized film;

attaching a second polarized film to the substrate so that a side portion of the second polarized film is correspondingly overlapped with the side portion of the first polarized film and is correspondingly attached to the anti-adhesive material on the side portion of the first polarized film;

correspondingly cutting off the overlapped side portions of the first polarized film and the second polarized film;

removing separated parts from the first polarized film and the second polarized film; and performing a flatten treatment to the cut side portions of the first polarized film and the second polarized film, wherein the flatten treatment includes a rolling process to perform surface rolling on the cut side portions and a bubble-remove process to remove bubbles occurred during performing the surface rolling on the cut side portions.

In one embodiment of the present invention, the bubble-remove process is to use hot air to soften the cut side portions to remove the bubbles.

In one embodiment of the present invention, the anti-adhesive material is release paper; the substrate is a glass substrate for constructing a liquid crystal cell; and an interval between the flattened first polarized film and the second polarized film is less than 0.02 micrometers.

The present invention further provides another method of splicing polarized films comprising steps of:

providing a substrate;

attaching a first polarized film to the substrate;

attaching a second polarized film to the substrate so that a side portion of the second polarized film is correspondingly overlapped with a side portion of the first polarized film;

correspondingly cutting off the overlapped side portions of the first polarized film and the second polarized film;

removing separated parts from the first polarized film and the second polarized film; and performing a flatten treatment to the cut side portions of the first polarized film and the second polarized film.

In one embodiment of the present invention, in the step of attaching the first polarized film on the substrate, an anti-adhesive material is mounted on an upper surface and a lower surface of the side portion of the first polarized film; in the step of attaching the second polarized film on the substrate, the side portion of the second polarized film is correspondingly attached to the anti-adhesive material on the side portion of the first polarized film; and in the step of removing separated parts from the first polarized film and the second polarized film, the anti-adhesive material is removed at the same time.

In one embodiment of the present invention, the step of performing a flatten treatment to the cut side portions of the first polarized film and the second polarized film includes a rolling process, and the rolling process is to perform surface rolling on the cut side portions.

In one embodiment of the present invention, the step of performing a flatten treatment to the cut side portions of the first polarized film and the second polarized film further includes a bubble-remove process, and the bubble-remove process is to remove bubbles occurred during performing the surface rolling on the cut side portions.

In one embodiment of the present invention, the bubble-remove process is to use hot air to soften the cut side portions to remove the bubbles.

In one embodiment of the present invention, the anti-adhesive material is release paper.

In one embodiment of the present invention, the substrate is a glass substrate for constructing a liquid crystal cell.

In one embodiment of the present invention, an interval between the flattened first polarized film and the second polarized film is less than 0.02 micrometers.

The method of splicing polarized films of the present invention is to make the side portions of two polarized films being overlapped with each other, then cut off the overlapped side portions and remove the separated parts, and perform flatten treatment so as to achieve an object of splicing the films. The interval between the polarized films can be effectively reduced to further improve the light leakage problem at the joint position of the polarized films and enhance yield of splicing polarized films.

DETAILED DESCRIPTION OF THE PREFERRED EMBODIMENTS

Figure 1:
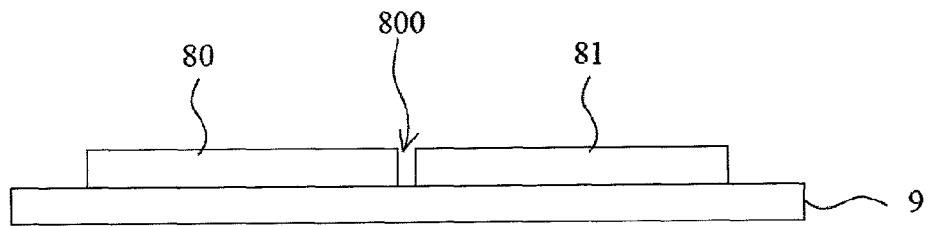
FIG. 1 is a side view of two conventional polarized films being spliced.

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Please refer to FIGS. 2A to 2E, FIGS. 2A to 2E are schematic flow diagrams of a preferred embodiment of a method of splicing polarized films in accordance with the present invention. The method of splicing polarized films comprises steps as the following:

S100: providing a substrate 1;
S101: attaching a first polarized film 2 to the substrate 1;
S102: attaching a second polarized film 3 to the substrate 1 so that a side portion 30 of the second polarized film 3 is correspondingly overlapped with a side portion 20 of the first polarized film 2;
S103: correspondingly cutting off the overlapped side portions 20, 30 of the first polarized film 2 and the second polarized film 3;
S104: removing separated parts of the side portions from the first polarized film 2 and the second polarized film 3; and
S105: performing a flatten treatment to the cut side portions 20, 30 of the first polarized film 2 and the second polarized film 3.

In the step S100, the substrate 1 is preferably a transparent glass substrate for constructing a liquid crystal cell and may be a color filter substrate or a TFT (thin-film transistor) array substrate.

Figure 2A:
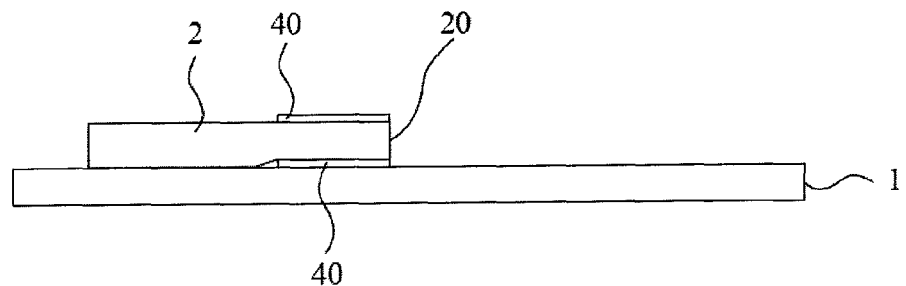
FIGS. 2A to 2E are schematic flow diagrams of a preferred embodiment of a method of splicing polarized films in accordance with the present invention.

As shown in FIG. 2A, in the step S101, the first polarized film 2 preferably has an anti-adhesive material 40 mounted an upper surface and a lower surface of the side portion 20 of the first polarized film 2. The anti-adhesive material 40 is preferably release paper.

Figure 2B:
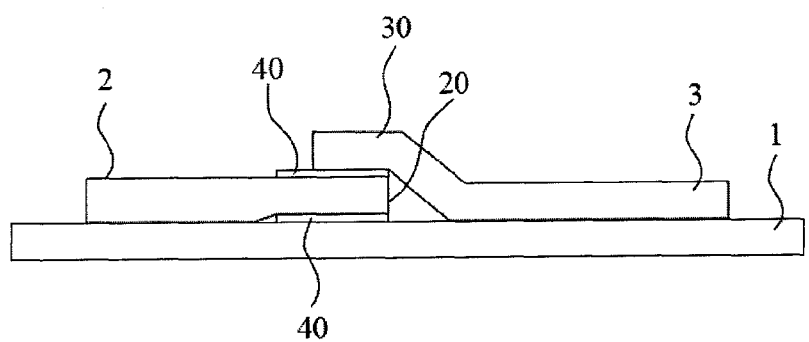

With reference to FIG. 2B, in the step S102, the side portion of the second polarized film 3 is correspondingly attached to the anti-adhesive material 40 on the upper surface of the side portion 20 of the first polarized film 2, thus, the side portion 30 of the second polarized film 3 is prevented from being directly pasted on the side portion 20 of the first polarized film 2.

Figure 2C:
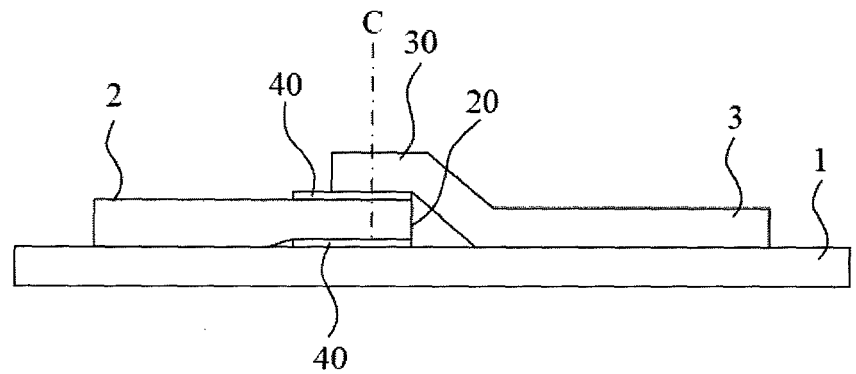

With reference to FIG. 2C, in the step S103, a cutting tool vertically cuts the overlapped side portions 20, 30 of the first polarized film 2 and the second polarized film 3 along a vertical line C so that a part of the side portion 20 of the first polarized film 2 is separated from the first polarized film 2; meanwhile, a part of the side portion 30 of the second polarized film 3 is separated from the second polarized film 3.

Figure 2D:
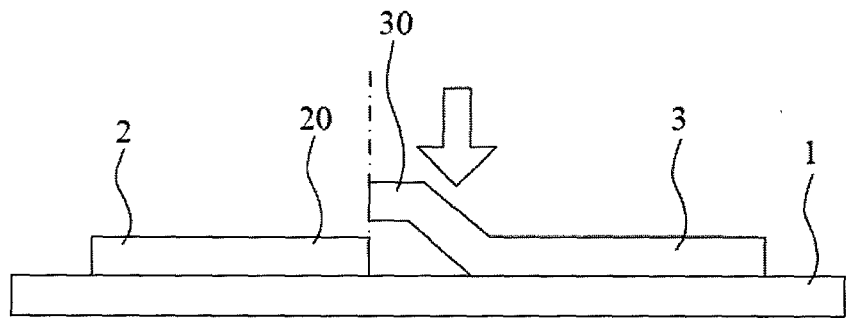

With reference to FIG. 2D, in the step S104, the parts that are separated from the first polarized film 2 and the second polarized film 3 are all removed, and the anti-adhesive material 40 on the upper surface and the lower surface of the side portion 20 of the first polarized film 2 is also removed at the same time. At this time, it can be seen that the side portion 30 of the second polarized film 3, which is originally stacked on the side portion 20 of the first polarized film 2, still has a winding part left.

Figure 2E:
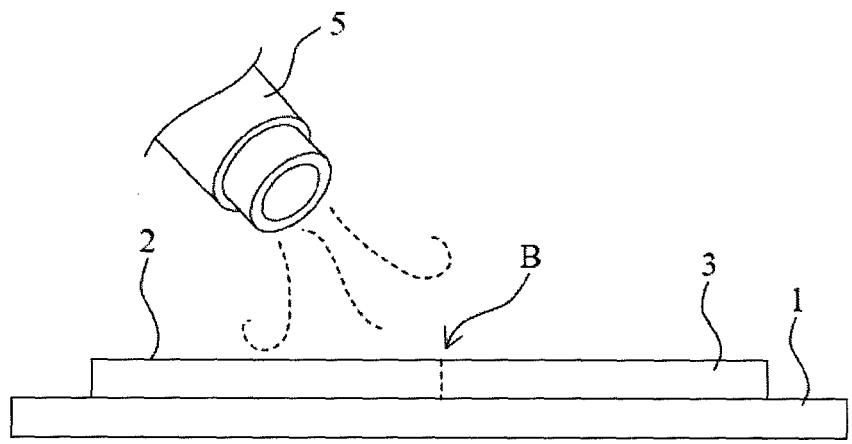

Then refer to FIG. 2E, in the step S105, the flatten treatment preferably includes a rolling process, and the rolling process is to perform surface rolling on the cut side portions 20, 30 so as to flatten the side portions 20, 30. Since bubbles may occur at a joint position of the side portions 20, 30 during the rolling process, the flatten treatment may further includes a bubble-remove process, and the bubble-remove process is to remove bubbles occurred during performing the surface rolling on the cut side portions 20, 30. Furthermore, the bubble-remove process is preferably to use a hot-air gun 5 to provide hot air to soften the cut side portions 20, 30 to remove the bubbles.

With reference to FIGS. 2D and 2E, because the length of the left winding side portion 30 of the second polarized film 3 is larger than an interval between the second polarized film 3 and the first polarized film 2, after performing the surface rolling on the winding side portion 30 of the second polarized film 3, the interval between the flattened first polarized film 2 and the second polarized film 3 may be less than 0.02 micrometers, and even the flattened first polarized film 2 and the second polarized film 3 are completely jointed together.

Because the interval between the first polarized film 2 and the second polarized film 3 is less than 0.02 micrometers, that is, the interval between the first polarized film 2 and the second polarized film 3 is less than a width of a pixel unit, hence, pixels corresponding to the joint position can display correctly without having light leakage.

By the above description, comparing with the shortcoming of the conventional technology of splicing polarized films that has limited splicing accuracy, the present invention provides an improved method of splicing polarized films that is to first make the side portions of two polarized films being directly overlapped with each other, then cut off the overlapped side portions and remove the separated parts, and perform flatten treatment so as to achieve an object of splicing the films. The interval between the polarized films can be effectively reduced to further improve the light leakage problem at the joint position of the polarized films and enhance yield of splicing polarized films.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A method of splicing polarized films comprising steps of:
    providing a substrate;
    attaching a first polarized film to the substrate, wherein an anti-adhesive material is mounted on an upper surface and a lower surface of a side portion of the first polarized film;

attaching a second polarized film to the substrate so that a side portion of the second polarized film is correspondingly overlapped with the side portion of the first polarized film and is correspondingly attached to the anti-adhesive material on the side portion of the first polarized film;

correspondingly cutting off the overlapped side portions of the first polarized film and the second polarized film to form a separated part of the side portion of the first polarized film and a separated part of the side portion of the second polarized film;

removing the separated parts of the side portions from the first polarized film and the second polarized film; and performing a flatten treatment to the cut side portions of the first polarized film and the second polarized film which splices the first polarized film to the second polarized film, wherein the flatten treatment includes a rolling process to perform surface rolling on the cut side portions and a bubble-remove process to remove bubbles occurred during performing the surface rolling on the cut side portions.

2. The method of splicing polarized films as claimed in claim 1, wherein the bubble-remove process is to use hot air to soften the cut side portions to remove the bubbles.

3. The method of splicing polarized films as claimed in claim 1, wherein the anti-adhesive material is release paper; the substrate is a glass substrate for constructing a liquid crystal cell; and an interval between the flattened first polarized film and the second polarized film is less than 0.02 micrometers.

4. A method of splicing polarized films comprising steps of:

providing a substrate;

attaching a first polarized film to the substrate;

attaching a second polarized film to the substrate so that a side portion of the second polarized film is correspondingly overlapped with a side portion of the first polarized film;

correspondingly cutting off the overlapped side portions of the first polarized film and the second polarized film to form a separated part of the side portion of the first polarized film and a separated part of the side portion of the second polarized film;

removing the separated parts of the side portions from the first polarized film and the second polarized film; and performing a flatten treatment to the cut side portions of the first polarized film and the second polarized film which splices the first polarized film to the second polarized film.

5. The method of splicing polarized films as claimed in claim 4, wherein in the step of attaching the first polarized film on the substrate, the first polarized film has an anti-adhesive material mounted on an upper surface and a lower surface of the side portion of the first polarized film; in the step of attaching the second polarized film on the substrate, the side portion of the second polarized film is correspondingly attached to the anti-adhesive material on the side portion of the first polarized film; and in the step of removing separated parts of the side portions from the first polarized film and the second polarized film, the anti-adhesive material is removed at the same time.

6. The method of splicing polarized films as claimed in claim 4, wherein the step of performing a flatten treatment to the cut side portions of the first polarized film and the second polarized film includes a rolling process, and the rolling process is to perform surface rolling on the cut side portions.

7. The method of splicing polarized films as claimed in claim 6, wherein the step of performing a flatten treatment to the cut side portions of the first polarized film and the second polarized film further includes a bubble-remove process, and the bubble-remove process is to remove bubbles occurred during performing the surface rolling on the cut side portions.

8. The method of splicing polarized films as claimed in claim 7, wherein the bubble-remove process is to use hot air to soften the cut side portions to remove the bubbles.

9. The method of splicing polarized films as claimed in claim 5, wherein the anti-adhesive material is release paper.

10. The method of splicing polarized films as claimed in claim 4, wherein the substrate is a glass substrate for constructing a liquid crystal cell.

11. The method of splicing polarized films as claimed in claim 4, wherein an interval between the flattened first polarized film and the second polarized film is less than 0.02 micrometers.

* * * * *